(No Model.)

E. J. LINCOLN.
PORTABLE ASH BASKET.

No. 420,559. Patented Feb. 4, 1890.

Witnesses:
Geo. H. Strong
J. H. Nurse

Inventor,
Elizabeth J. Lincoln
By Dewey & Co.
Attys

UNITED STATES PATENT OFFICE.

ELIZABETH J. LINCOLN, OF SAN FRANCISCO, CALIFORNIA.

PORTABLE ASH-BASKET.

SPECIFICATION forming part of Letters Patent No. 420,559, dated February 4, 1890.

Application filed September 6, 1889. Serial No. 323,159. (No model.)

*To all whom it may concern:*

Be it known that I, ELIZABETH J. LINCOLN, of the city and county of San Francisco, State of California, have invented an Improvement in Portable Ash-Baskets; and I hereby declare the following to be a full, clear, and exact description of the same.

My invention relates to what I term a "portable ash-basket."

It consists of a movable foraminous receptacle, which is placed within a grate for the purpose of containing the ashes produced by the burning of the fuel, and in connection therewith of handles whereby it may be removed.

Figure 1:
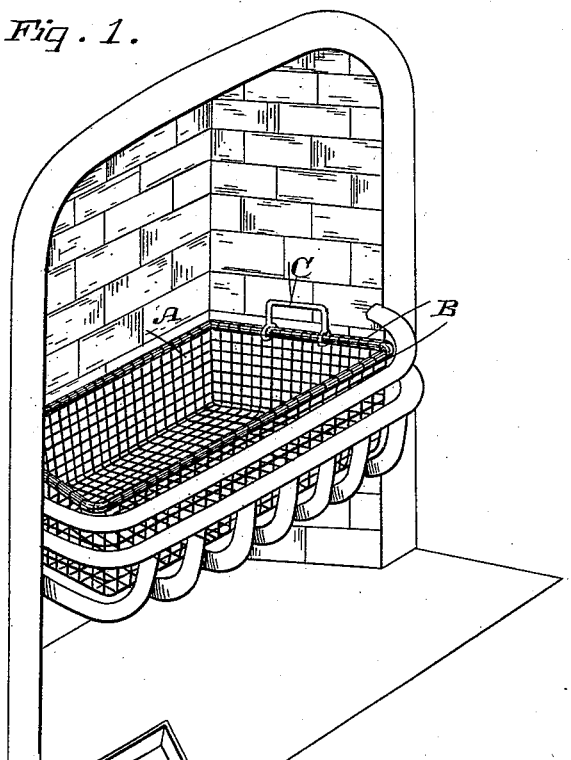
Figure 2:
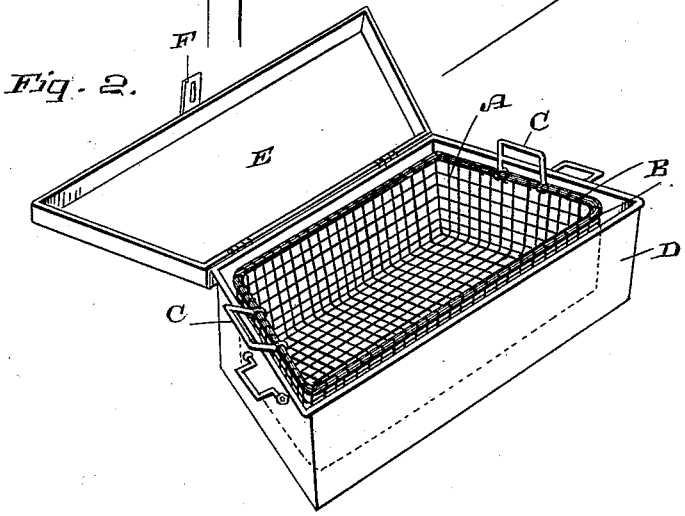

Referring to the accompanying drawings for a more complete explanation of my invention, Figure 1 is a view of the basket in a grate. Fig. 2 shows the basket and its containing-case.

A is the basket, which I form preferably of wire-netting of such a shape as to approximately fit within the grate for which it is designed. Around the upper edge of the basket is a stout wire rod or border B, and to the ends of this are attached the handles C, which are adapted to fold down upon the outside and out of the way, so that the basket may be easily set into the grate, and when it is necessary to remove it it can be taken up by these handles.

D is a metal case, made of the same shape as the basket and of sufficient size to easily contain it, and having a hinged cover E and a clamp or fastening F, as shown.

The operation will then be as follows: The basket is placed within the grate when the latter is clean and before any fire is made. The materials for the fire are placed within the basket, and the fire being built is treated in all respects as if within an ordinary grate. The basket retains the ashes and products left after the combustion of the fuel, and by reason of its close mesh it retards the draft and makes a considerable saving in the use of fuel in the grate. When the fire has been extinguished, or the basket has become full of ashes and it is necessary to remove it, it is lifted out by the handles, taking all the ashes with it, and is set into the receptacle D and the cover closed. It may then be removed from the room and carried to the place where the ashes are to be left without making any dirt or dust in the room. By this device the annoyance and dirt usually caused by the use of open grates are avoided.

Having thus described my invention, what I claim as new, and desire to secure by Letters Patent, is—

1. The combination, with the open grate, of a removable basket fitted within said grate so as to retain the ashes produced by the combustion of the fuel therein, substantially as described.

2. The combination, with an open grate, of a basket made of wire-cloth, having a rim around the top and the handles at the ends, and fitted into the grate so as to be removable therefrom, substantially as described.

In witness whereof I have hereunto set my hand.

ELIZABETH J. LINCOLN.

Witnesses:
S. H. NOURSE,
H. C. LEE.